O. A. DONATH.
VALVE GEAR.
APPLICATION FILED JUNE 16, 1913.
1,073,576.
Patented Sept. 16, 1913.
2 SHEETS—SHEET 1.
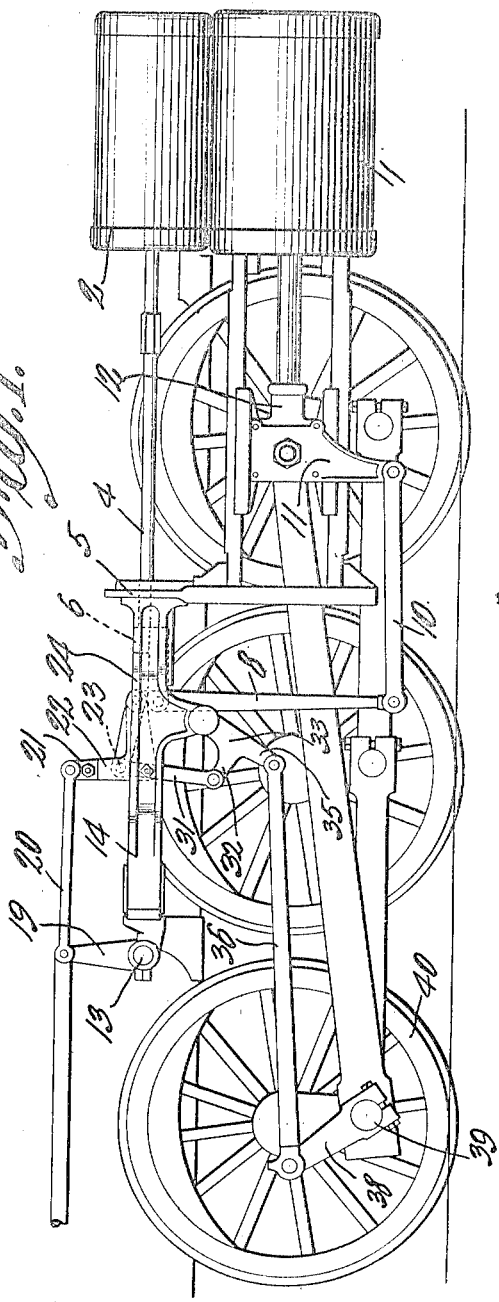
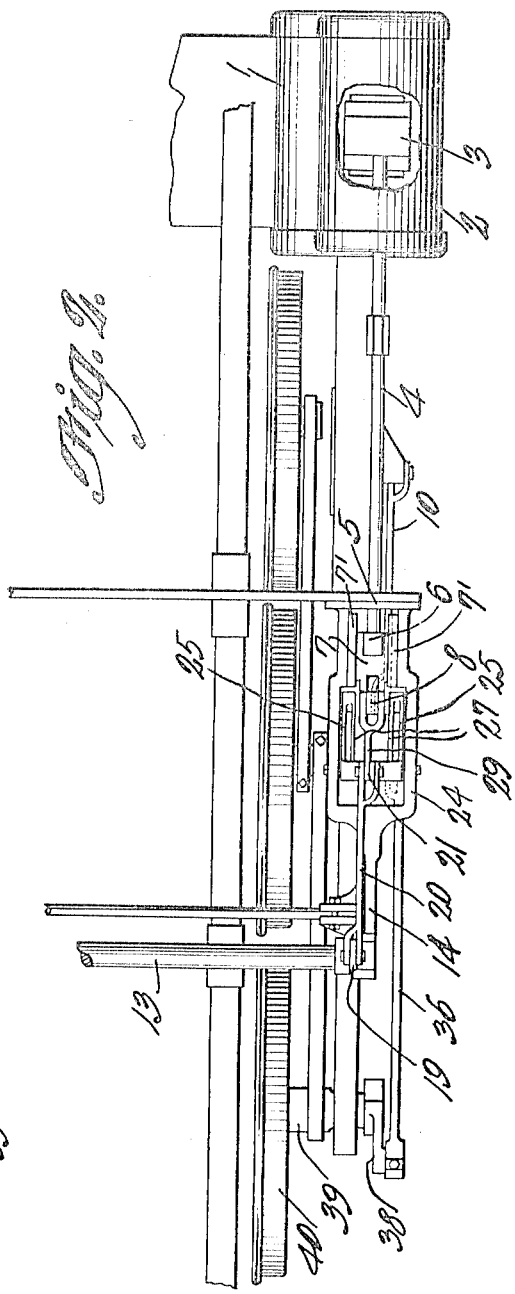
Witnesses
Otto A. Donath
Inventor
by
Attorneys

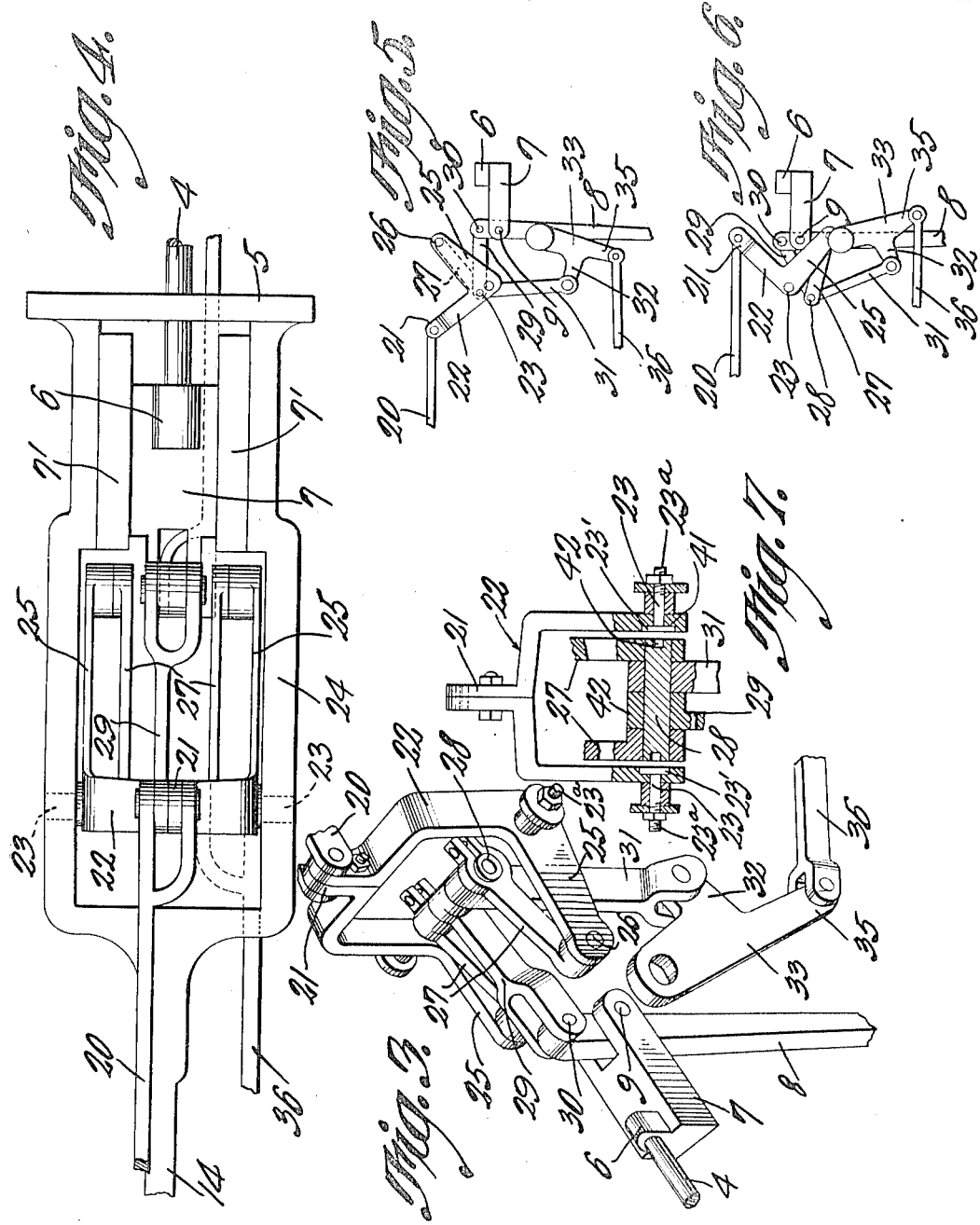

UNITED STATES PATENT OFFICE.

OTTO A. DONATH, OF SEDALIA, MISSOURI.

VALVE-GEAR.

1,073,576. Specification of Letters Patent. Patented Sept. 16, 1913.

Application filed June 16, 1913. Serial No. 774,033.

*To all whom it may concern:*

Be it known that I, OTTO A. DONATH, a citizen of the United States, residing at Sedalia, in the county of Pettis and State of Missouri, have invented a new and useful Valve-Gear, of which the following is a specification.

The present invention relates to improvements in valve gearing for steam engines.

One of the objects of the invention is to provide an improved gearing arranged to impart the desired movement to the valve while employing a minimum number of parts and with those parts so arranged that it will be very easy for the engineer to shift the gearing to control the valve.

It is a further object of the invention to provide a valve gearing in which radius links are employed, said links being manually shiftable to points upon opposite sides of a neutral position, together with means for securing such links in their neutral position in the event that one side of the locomotive, to which the valve gearing is applied, becomes disabled.

A further object of the invention is the provision of a valve gearing employing radius links, the throw of the parts being varied by the manual shifting of a member to which said links are pivoted; this variable movement of said radius links in turn controlling the throw imparted to a lever, and this lever in turn having a pivotal connection with the valve stem in such manner that said pivotal connection is caused to travel in a straight line, by virtue of which construction, the complex movement (which results when the connection of the valve stem with the remaining members is a swinging one) is avoided and a very simple and direct connection of the parts is had.

Further objects and advantages of the invention will be set forth in the detailed description which now follows:

In the accompanying drawing, Figure 1 is a side elevation of a portion of a locomotive having the present invention applied thereto, Fig. 2 is a plan view showing one side of the valve gear with the steam chest of the locomotive broken away to disclose the valve, Fig. 3 is a perspective view of the valve gearing, Fig. 4 is a plan view, on an enlarged scale, of a portion of the frame in and from which the mechanism shown in Fig. 3, is supported, Figs. 5 and 6 are detail views illustrating the extreme rearward and forward positions, respectively, of the valve controlling mechanism, and Fig. 7 is an enlarged detail sectional view of a bell-crank yoke and the associated parts.

Like numerals designate corresponding parts in all of the figures of the drawing.

Referring to the drawing, the numeral 1 designates the cylinder and 2 the steam chest in which is mounted the valve 3 of usual structure. A rod 4 is connected to each valve and has its rear end guided in the forward portion 5 of the frame, its extreme rear end being connected to the lug 6 of a valve cross head 7. This cross head is mounted for sliding movement in the guides 7' of the frame.

A lever 8 is pivoted at 9 to the cross head 7 and the lower end of this lever is pivotally connected to a link 10. The forward end of this link is pivotally connected to a plate 11 carried by the piston cross head 12. A reversing shaft 13 extends transversely at the rear of the frame 14 and is operated in the usual manner by the reach rod controllable from the cab of the engine.

A crank 19 is carried at each end of the rock shaft 13 and connected to each crank 19 and extending forwardly therefrom is a rod 20 pivoted at its forward end to the upper portion 21 of a bell-crank yoke 22. Bolts 23 form a pivotal support for the bell-crank yoke 22 within the open auxiliary frame 24. The forwardly extending arms 25 of the bell-crank yoke have pivotally connected thereto at 26, two parallel radius links 27 whose rear ends are clamped to pin 28 (see Figs. 3 and 7).

A connecting rod 29 is pivoted at its rear end upon pin 28 and its forward end is bifurcated and pivoted at 30 to the upper end of lever 8. A link 31 is pivoted at its upper end upon pin 28 and its lower end is bifurcated and pivotally connected to an arm 32 of the lever 33.

As is best illustrated in Fig. 1, the upper end of this lever is pivotally connected at 34 to the frame 24. The lower end 35 of lever 33 has pivotally connected thereto the bifurcated end of eccentric rod 36. This eccentric rod is pivotally connected to the short crank 38 carried by the eccentric pin 39 of the drive wheel 40 of the locomotive.

It will be noted that the bell-crank yoke 22 is formed of two members bolted together and as best illustrated in Fig. 7, detachably carries the bolts 23. These bolts under normal conditions have their heads 23' seated in the sockets 41 of the yoke 22. A socket 42 is formed in each end of the pin 28 and if the valve gear should become crippled, these sockets serve to receive the ends 23ᵃ of the bolts 23 and thereby pin 28 is locked in concentric relation with the pivotal mounting of yoke 22. This is accomplished by removing and reversing bolts 23 so that the heads 23' are upon the opposite side as viewed in Fig. 7 and the ends 23ᵃ of the bolts are disposed in the sockets 42 of pin 28. Since at this time the radius links 27 are in alinement with the arms 25, it follows that no movement of lever 8 takes place. Thus with this arrangement, though one side of the valve gear be crippled, the locomotive can be operated with the lead open on the crippled side.

It is desirable in valve gearing to provide such an arrangement of the parts as to secure full admission at the beginning of each piston stroke, a quick cut-off at equal distances of piston travel on the forward and backward stroke, and prompt and full release at the end of each stroke whereby undue back pressure is avoided, only enough steam being trapped and retained as will serve to efficiently cushion the piston at the termination of its travel. It is also desirable to so arrange the parts that movement of the engine frame with relation to the wheels will not disturb the proper action of the valve. It will be seen that the structure herein shown and described accomplishes all of these objects.

The movement of the cross head imparts to lever 8 the same increasing and diminishing speed movement from and to a state of rest, but since the connecting rod passes its dead centers while the eccentric is passing its 90° centers, it follows that the speed of the eccentric rod is increasing while the speed of the connecting rod is decreasing, and vice versa, and that the highest speed of each is reached while the other is at rest. With the cross head at a state of rest at the end of its stroke, movement of the eccentric rod is imparted to the valve through the connections described, to secure the initial full admission of steam. The point at which the cut-off takes place is determined by the position to which the radius links have been shifted by the bell-crank yoke, for it is apparent that the shifting of these radius links in effect shifts the fulcrum of lever 8.

From the foregoing description, it will be seen that simple and efficient means comprising a minimum number of wearing points are herein provided, but while the elements shown and described are well adapted to serve the purposes for which they are intended, it is to be understood that they merely are exemplary of the preferred embodiment of the invention and that the invention is not limited thereto, as changes may be made and the invention otherwise embodied without departing from its spirit or the scope of the appended claims.

What is claimed is:

1. The combination with a locomotive having a frame, a cross head, a drive wheel, and an eccentric pin carried by the drive wheel, of a valve gear including a valve operating rod, a slidable connecting medium connected to the rod, and cooperating means connected to the connecting medium and to the eccentric and cross-head to form a timing and movement limiting means for the valve rod, said cooperating means including a bell crank lever fulcrumed to the frame, manually controlled means for varying the position of the bell crank lever, a lever connected to the cross head and the sliding connecting medium, and means connected to the bell crank lever and the last lever, whereby the variable position of the bell crank lever regulates the speed, time and distance of movement of the valve rod.

2. A valve gear, including an open frame, a valve cross-head slidably mounted therein, a double yoked bell crank lever, detachable means for connecting the bell crank lever within the open frame, two radius rods pivotally connected to the bell crank lever within the open frame, a pin connecting the radius rods for movement in unison, said pin disposed to be placed in axial alinement to the fulcruming means of the yoked bell crank lever, an actuating lever for the valve cross-head connected to the valve cross-head and operably connected to the pin whereby the distance of movement of the last lever is controlled, and means for varying the relative position of the pin to the fulcruming point of the bell crank lever to regulate the time, speed and distance of movement of the valve cross head.

3. The combination with a locomotive having a main frame, a piston cross head, a drive wheel, and an eccentric pin carried by the drive wheel, of a valve gear including an open frame, a valve cross head slidably mounted therein, a double yoked bell crank lever, detachable means for connecting the bell crank lever within the open frame, two radius rods pivotally connected to the bell crank lever within the open frame, a pin connecting the radius rods for movement in unison, said pin disposed to be placed in axial alinement to the fulcruming means of the yoked bell crank lever, an actuating lever for the valve cross head connected to the valve cross head and operably connected to the pin whereby the distance of movement of the last lever is controlled, and means operably connected to the pin of the radius rods and the eccentric pin of the drive wheel, whereby the speed, time and distance of movement of the valve cross head is regulated by the coactive movement of the piston, cross head and the drive wheel.

4. A valve gear, including an open frame, a valve cross head slidably mounted therein, a double yoked bell crank lever, detachable means connecting the bell crank lever within the open frame, two radius rods pivotally connected to the bell crank lever within the open frame, a pin connecting the radius rods for movement in unison, said pin disposed to be placed in axial alinement to the fulcruming means of the yoked bell crank lever, an actuating lever for the valve cross head connected to the valve cross head and operably connected to the pin whereby the distance of movement of the last lever is controlled, means for varying the relative position of the pin to the fulcruming point of the bell crank lever to regulate the time, speed and distance of movement of the valve cross head, and coöperating means carried by the radius rod pin and the fulcrum of the bell crank lever for fixedly connecting the radius rod pin to the bell crank lever to hold the valve in the lead open position.

5. A valve gear, including an open frame, a valve cross head slidably mounted therein, a double yoked bell crank lever, detachable means connecting the bell crank lever within the open frame, two radius rods pivotally connected to the bell crank lever within the open frame, a pin connecting the radius rods for movement in unison, said pin disposed to be placed in axial alinement to the fulcruming means of the yoked bell crank lever, an actuating lever for the valve cross head connected to the valve cross head and operably connected to the pin whereby the distance of the movement of the last lever is controlled, the opposite ends of the radius rod pin being provided with sockets, and means for detachably connecting the fulcrum points of the bell crank lever to the open frame whereby the same may be removed and reversed to engage the sockets of the radius rod pin to hold the radius rod pin in a fixed position relative to the bell crank lever.

6. The combination with a locomotive having a main frame, a piston cross head, a drive wheel, and an eccentric pin carried by the drive wheel, of a valve gear including an open frame, a valve cross head slidably mounted therein, a double yoked bell crank lever, detachable means for connecting the bell crank lever within the open frame, two radius rods pivotally connected to the bell crank lever within the open frame, a pin connecting the radius rods for movement in unison, said pin disposed to be placed in axial alinement to the fulcruming means of the yoked bell crank lever, an actuating lever for the valve cross head connected to the valve cross head and operably connected to the pin whereby the distance of movement of the last lever is controlled, a lever having one end pivotally connected to the open frame, a rod pivotally connecting the other end to the eccentric pin of the drive wheel, and a link connected to the last lever and the pin connecting the radius rod whereby as the drive wheel rotates, the relative position of the radius rod pin is varied.

7. The combination with a valve actuating link, of a manually operable member, a reversible pivot upon which said member swings, and a radius rod connected pivotally at one of its ends to said member and swinging upon an arc which intersects the pivotal point of said member, the other end of the radius rod being pivotally connected to said link, said reversible pivot when in one position pivoting the manually operable member and when in reversed position holding the pivotal connection of the radius rod and the link in concentric relation to the pivotal point of the manually operable member.

8. In a valve gearing, the combination with a valve stem, of a link, means for imparting movement from said link to said stem, a manually operable bell-crank, means for pivoting said bell-crank, a radius link pivoted to one end of said bell-crank, the free end of which describes an arc intersecting the pivot point of said bell-crank, the free end of said radius link being pivotally connected to the first named link, and means for locking the free end of the radius link into engagement with the pivotal point of the bell-crank.

9. In a valve gearing, the combination with a valve stem, of a link, means for imparting movement from said link to said stem, a manually operable bell-crank yoke, means for pivotally mounting said bell-crank yoke, a pair of radius links pivoted to the free ends of said yoke, the other ends of said radius links describing an arc intersecting the pivot point of said yoke, said ends being pivotally connected to the first named link, and means for locking said ends of said radius links into engagement with the pivotal point of the yoke.

10. In a valve gearing, the combination with a valve stem, of a link, means for imparting movement from said link to said stem, a manually operable bell-crank yoke, means for pivotally mounting said bell-crank yoke, a pair of radius links pivoted to the free ends of said yoke, the other ends of said radius links describing an arc intersecting the pivot point of said yoke, said ends being pivotally connected to the first named link, means for locking said ends of said radius links into engagement with the pivotal point of the yoke, and means for imparting bodily movement to the free ends of said radius links from a moving part of the engine.

11. In a valve gearing, the combination with a valve stem, of a floating lever, means for pivoting said stem to said lever, said means being guided to move in a straight line, means for actuating said floating lever from the cross head of the engine, a pivoted, manually operable member, a part of which swings in an arc having the pivot of said member as a center, a radius rod pivoted to said manually operable member in the line of said arc, and of such length as to describe an arc from its pivot point which intersects the pivot point of the manually operable member, a connecting member extending directly between the free end of said radius rod and said floating lever, and means driven from a moving part of the engine and engaged with the free ends of the radius rods for imparting movement thereto.

12. In a valve gearing, the combination with a valve stem, of a link, means for imparting movement from said link to said stem, a manually operable pivoted member, a radius link pivoted to a swinging portion thereof, the free ends of said radius link describing an arc which intersects the pivot point of said member, the free end of said radius link being pivotally connected to said first named link, and means for locking the free ends of said radius link into alinement with the pivotal point of the manually operable member.

13. In a valve gearing, the combination with a valve stem, of a link, means for imparting movement from said link to said stem, a manually operable pivoted member, a radius link pivoted to a swinging portion thereof, the free ends of said radius link describing an arc which intersects the pivot point of said member, the free ends of said radius link being pivotally connected to said first named link, means for locking the free ends of said radius link into alinement with the pivotal point of the manually operable member, and means for imparting bodily movement to the free ends of said radius link from a moving part of the engine.

14. The combination with a valve actuating link, of a manually operable pivoted member, a radius rod connected pivotally at one of its ends to said manually operable member and swinging upon an arc which intersects the pivotal point of the manually operable member, the other end of said radius rod having pivotal connection with said link, and means for securing the pivotal connection of the radius rod and said link in concentric relation to the pivotal point of the manually operable member.

15. In a valve gearing, the combination with a manually operable member, of a reversible pivot for said member, a radius rod pivoted at one of its ends to said member, the opposite end thereof describing an arc which intersects the pivot point of said manually operable member and a pivot pin carried by the free end of said radius rod and having a socket formed in its end which receives said reversible pivot when the latter is in reversed position to thereby hold said pivot pin in concentric relation to said reversible pivot.

In testimony that I claim the foregoing as my own, I have hereto affixed my signature in the presence of two witnesses.

OTTO A. DONATH.

Witnesses:
HOLMES HALL,
C. C. YOUNG.